United States Patent
Yamamoto et al.

(10) Patent No.: US 8,528,710 B2
(45) Date of Patent: Sep. 10, 2013

(54) MOBILE TYPE NON-CONTACT POWER FEEDING DEVICE

(75) Inventors: Kitao Yamamoto, Akishima (JP); Takeshi Sato, Akishima (JP); Keisuke Abe, Akishima (JP); Masashi Mochizuki, Akishima (JP); Yasuyuki Okiyoneda, Akishima (JP)

(73) Assignee: Showa Aircraft Industry Co., Ltd., Tokyo (JP)

( * ) Notice: Subject to any disclaimer, the term of this patent is extended or adjusted under 35 U.S.C. 154(b) by 191 days.

(21) Appl. No.: 13/081,202

(22) Filed: Apr. 6, 2011

(65) Prior Publication Data

US 2011/0248574 A1   Oct. 13, 2011

(30) Foreign Application Priority Data

Apr. 7, 2010   (JP) .................. 2010-088411

(51) Int. Cl.
*B60L 9/00*   (2006.01)
*B60M 1/00*   (2006.01)

(52) U.S. Cl.
USPC ............................. 191/10; 191/18

(58) Field of Classification Search
USPC .................. 191/2, 6, 10, 13, 14, 17, 18, 22 R
See application file for complete search history.

(56) References Cited

U.S. PATENT DOCUMENTS

| | | | | |
|---|---|---|---|---|
| 3,914,562 A | * | 10/1975 | Bolger | 191/10 |
| 5,311,973 A | * | 5/1994 | Tseng et al. | 191/10 |
| 5,669,470 A | * | 9/1997 | Ross | 191/10 |
| 5,821,728 A | * | 10/1998 | Schwind | 320/108 |

FOREIGN PATENT DOCUMENTS

| | | |
|---|---|---|
| JP | 6-335117 | 12/1994 |
| JP | 2009-071909 | 4/2009 |
| WO | WO-92/17929 | 10/1992 |
| WO | WO-98/50993 | 11/1998 |
| WO | WO-2007/008646 | 1/2007 |

* cited by examiner

*Primary Examiner* — R. J. McCarry, Jr.
(74) *Attorney, Agent, or Firm* — Jordan and Hamburg LLP

(57) ABSTRACT

A non-contact power feeding device feeds power from a power transmission coil to a power receiving coil based on a mutual induction effect of electromagnetic induction. In such a non-contact power feeding device, power can be fed to the power receiving coil by a mobile power feeding method whereby the power receiving coil is moved corresponding to the stationary power transmission coil through an air gap in the case of power feeding. The power transmission coil and the power receiving coil are respectively formed in a loop-shaped flat structure. A crossover coil is adopted to serve as the power transmission coil. The crossover coil is formed in a long loop shape along the direction of movement of the power receiving side and is crossed along the way to provide a plurality of units. It is however to be noted that a resonant repeating coil can be used together with the power transmission coil to adopt the crossover coil as its repeating coil.

15 Claims, 6 Drawing Sheets

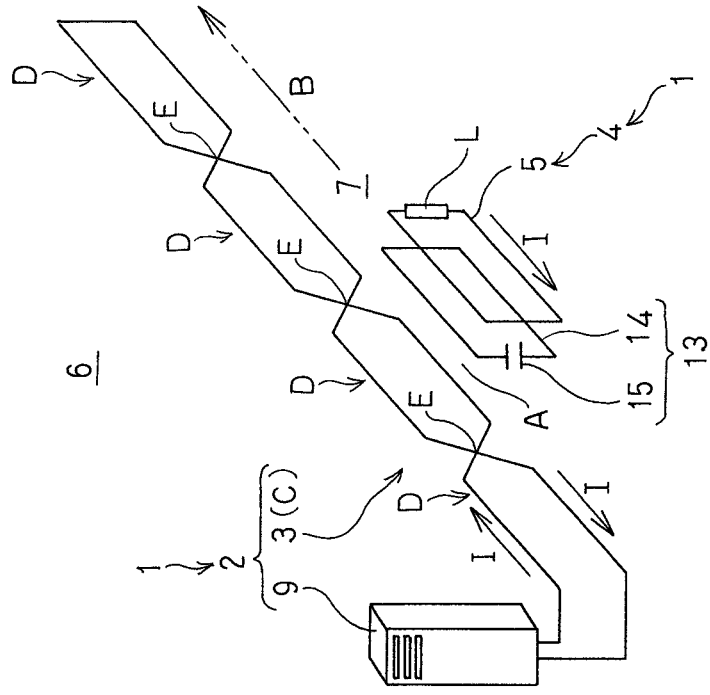
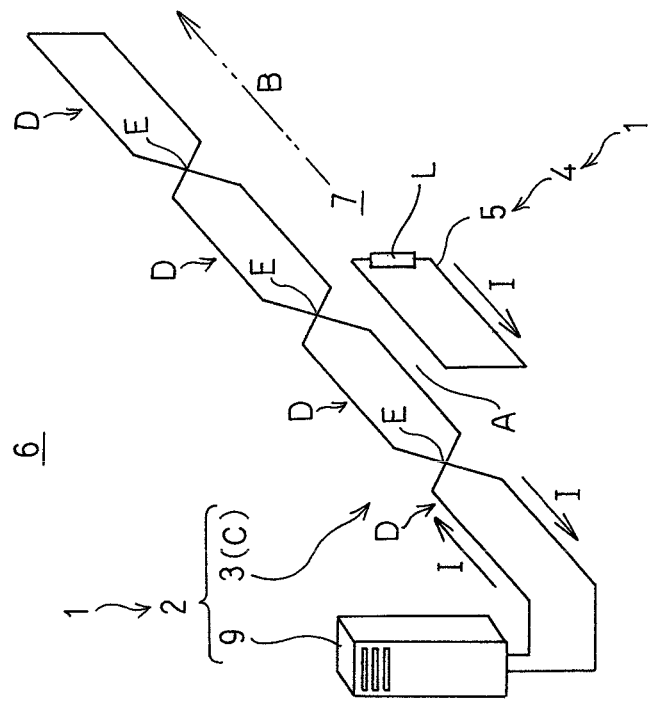

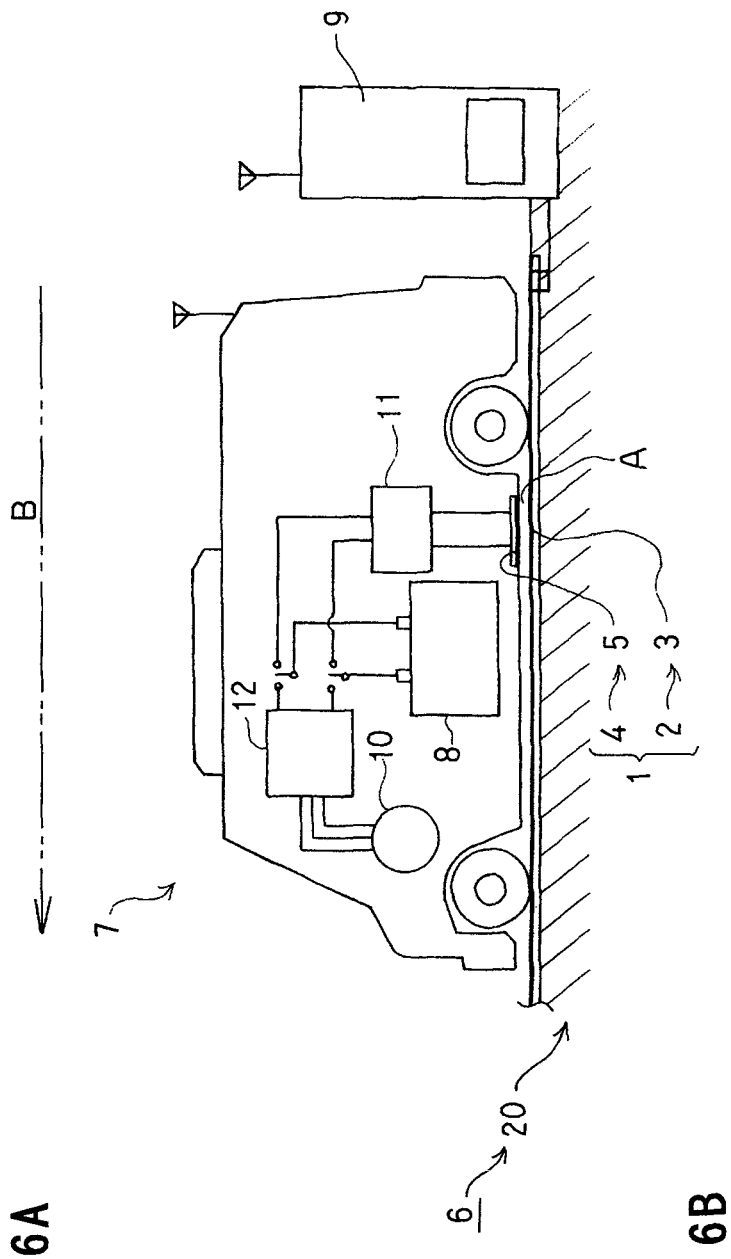
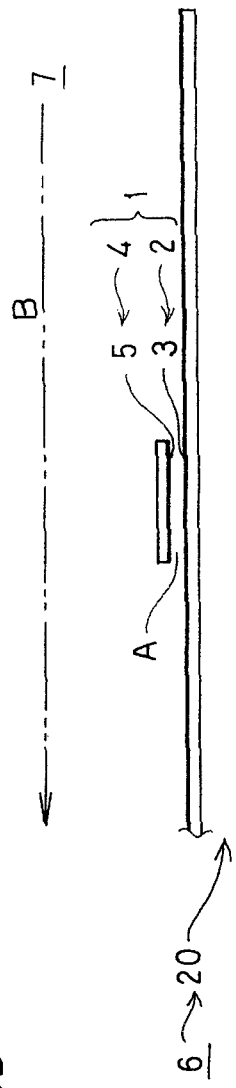
FIG. 6A
FIG. 6B

MOBILE TYPE NON-CONTACT POWER FEEDING DEVICE

BACKGROUND OF THE INVENTION

The present invention relates to a mobile type non-contact power feeding device, and more particularly to a non-contact power feeding device adapted to feed power, with no contact, to a moving secondary side, that is, a power receiving side or a pickup side from a stationary primary side, that is, a power feeding side or a track side.

A non-contact power feeding device adapted to feed power to, for example, a battery of an electric vehicle without any mechanical contact such as a cable has been developed based on the demand and this device is in practical use.

In this non-contact power feeding device, power is fed through an air gap in a closely corresponding manner to a power receiving coil of a power receiving side mounted on a movable body such as an electric vehicle from a stationary power transmission coil of a power feeding side based on a mutual induction effect of electromagnetic induction.

A stopped type power feeding method is a representative example for feeding power by the non-contact power feeding device, but a convenient mobile type power feeding method which is not required to purposely stop for power feeding has also been developed and this method is in practical use.

Referring to the stopped type power feeding method, the movable body is required to stop in the case of power feeding and the power receiving coil is positioned to stop on or over the power transmission coil to feed power. On the contrary, in the mobile type power feeding method, the movable body is not required to stop in the case of power feeding and power feeding is effected while the power receiving coil is moving near the power transmission coil.

The technology disclosed in the following Japanese Unexamined Patent Publication No. H06-506099 (Japanese translation of PCT international application) is a representative example of a mobile type non-contact power feeding device.

However, this non-contact power feeding device is suitable for an automated guided vehicle which is used in a factory and the like, but there is a disadvantage that it is not suitable for use in an electric vehicle which is running on a road. In other words, the power receiving coil of the power receiving side is required to move through an extremely-close small air gap relative to the stationary power transmission coil of the power feeding side.

In order to overcome such a disadvantage of the non-contact power feeding device as disclosed in Japanese Unexamined Patent Publication No. H06-506099 (Japanese translation of PCT international application), the technologies disclosed in the following Japanese Unexamined Patent Publication No. 2002-508916 (Japanese translation of PCT international application) and Japanese Unexamined Patent Publication No. 2009-501510 (Japanese translation of PCT international application) have been developed.

The technologies disclosed in Japanese Unexamined Patent Publication No. 2002-508916 (Japanese translation of PCT international application) and Japanese Unexamined Patent Publication No. 2009-501510 (Japanese translation of PCT international application) are characterized in that an independent repeating circuit is provided to serve as a resonant circuit on a power feeding side and/or a power receiving side, and a repeating coil of the resonant circuit is disposed in a magnetic path of the air gap. With this arrangement, the mobile type non-contact power feeding device composed of this resonant repeating method enables power supply through a large air gap and is suitable for feeding power to, for example, an electric vehicle.

It has been pointed out that the mobile type non-contact power feeding device has the following problems.

In the non-contact power feeding device, power feeding is conducted based on a mutual induction effect of electromagnetic induction. Since a high frequency magnetic field (an alternate-current variable magnetic field) is strongly formed to radiate and diffuse high frequency electromagnetic waves at a strong intensity, there is a possibility that this has an adverse affect on the neighboring environment.

For example, in an area which is tens of meters to hundreds of meters away, it has been pointed out that there is a risk that electromagnetic pollution such as possible electromagnetic disturbance and electronic jamming are caused and a risk that dysfunction is created on human bodies.

Under these circumstances, for example, in Japan, the Radio Law sets limits on facilities where a high frequency of 10 kHz or more is used to make the intensity of electromagnetic waves radiated from these facilities less than or equal to the regulatory value.

On the contrary, in the case of the stopped type non-contact power feeding device described above, it is easy to take measures for electromagnetic shielding. In other words, since a loop of the power transmission coil of the power feeding side is small, by covering the power transmission coil with an electromagnetic-wave shielding cover in which an electrically conductive material is used, it is easy to reflect, absorb and attenuate the radiated electromagnetic waves to the regulatory value level or lower.

On the contrary, in the case of the mobile type non-contact power feeding device, it is difficult to take measures for the electromagnetic shielding.

In other words, the power transmission coil of the power feeding side, in view of the fact that the power receiving side is moving, is formed in a long and massive loop shape along the direction of movement and has a large loop area. In this manner, it is not easy to take such an electromagnetic shielding measure as to cover the power transmission coil with the electromagnetic shielding cover and as a result, it is easy for the radiated electromagnetic waves to reach a neighboring area.

Accordingly, a conventional mobile type non-contact power feeding device has been set and used in a range in which the usable frequency does not exceed the regulatory value, that is, 10 kHz.

Referring to the non-contact power feeding device, expansion of an air gap is a major theme in view of the needs such as widespread utilization of the electric vehicles.

Even in the mobile type non-contact power feeding device, the technologies disclosed in Japanese Unexamined Patent Publication No. 2002-508916 (Japanese translation of PCT international application) and Japanese Unexamined Patent Publication No. 2009-501510 (Japanese translation of PCT international application) described above have been developed in view of such needs and themes, but because of adoption of the resonant repeating method, those technologies are premised on the use of a high frequency AC of 10 kHz or more, for example, a high frequency AC of the degree of tens of kHz to 100 kHz, from the aspect of efficiency.

Accordingly, if this mobile type non-contact power feeding device is adopted, as is, to feed power to an electric vehicle which is running on an express highway or other roads, the electromagnetic waves radiated outside become stronger to have a greater risk of generating the electromagnetic pollution described above. It is therefore quite difficult to adopt the mobile type non-contact power feeding device under the existing conditions because of the problems described above.

SUMMARY OF THE INVENTION

A mobile type non-contact power feeding device of the present invention was developed to solve the problems of the conventional technology in view of the actual conditions thereof.

It is therefore an object of the present invention to provide an improved mobile non-contact power feeding device in which, first, there is no risk of electromagnetic pollution and, second, expansion of an air gap can be realized and which, third, can contribute to the widespread utilization of an electric vehicle.

A technical means of the present invention for solving these problems is described below and claimed.

(Aspect 1)

A mobile type non-contact power feeding device is provided, in which power is fed from a power transmission coil of a power feeding side circuit to a power receiving coil of a power receiving side circuit based on a mutual induction effect of electromagnetic induction.

Power can be fed to the power receiving coil by a mobile power feeding method whereby the power receiving coil is moved corresponding to the stationary power transmission coil through an air gap.

The power transmission coil and the power receiving coil are respectively formed in a loop-shaped flat structure and a crossover coil is adopted to serve as the power transmission coil.

The crossover coil is formed in a long loop shape along the direction of movement of the power receiving side and is crossed along the way to provide a number of units.

Further, as described in the following aspects 2 through 15, the mobile type non-contact power feeding device according to the present invention can be modified by adding technically limited elements.

(Aspect 2)

In the mobile type non-contact power feeding device according to aspect 1, the crossover coil is provided in such a manner that a magnetic field is generated from the units formed by the crossover alternately in the plus and minus directions.

(Aspect 3)

In the mobile type non-contact power feeding device according to aspect 2, the crossover coil is set in such a manner that the area of the units generating a magnetic field in the plus direction is equal to that of the units generating a magnetic field in the minus direction.

(Aspect 4)

In the mobile type non-contact power feeding device according to aspect 1, a repeating coil of a repeating circuit is disposed corresponding to the power receiving coil of the power receiving side circuit.

The repeating circuit is independent of the power receiving side circuit and the repeating coil resonates with a capacitor disposed in the repeating circuit and moves together with the power receiving coil.

(Aspect 5)

In the mobile type non-contact power feeding device according to aspect 1, power feeding is effected by a side power feeding method whereby the power transmission coil of the power feeding side circuit is fixedly disposed on the side of an upright roadside section relative to a road surface or a ground surface.

(Aspect 6)

In the mobile type non-contact power feeding device according to aspect 1, power feeding is effected by a lower power feeding method whereby the power transmission coil of the power feeding side circuit is fixedly disposed on the side of a road surface or a ground surface.

(Aspect 7)

In the mobile type non-contact power feeding device according to aspect 1, the power receiving side circuit such as the power receiving coil is mounted on a vehicle such as an automobile or other movable body.

(Aspect 8)

In the mobile type non-contact power feeding device according to aspect 1, a repeating coil of a repeating circuit is fixedly disposed corresponding to the power transmission coil. The repeating circuit is independent of the power feeding side circuit and the repeating coil resonates with a capacitor disposed in the repeating circuit. In the case of power feeding, the power receiving coil moves corresponding to the repeating coil through an air gap.

The crossover coil as in aspect 1 is not adopted to serve as the power transmission coil of the power feeding side circuit. Instead, the crossover coil is adopted to serve as the repeating coil of the repeating circuit.

(Aspect 9)

In the mobile type non-contact power feeding device according to aspect 8, a capacitor of the repeating circuit is disposed for each unit of the repeating coil consisting of the crossover coil.

(Aspect 10)

In the mobile type non-contact power feeding device according to aspect 8, the crossover coil is provided in such a manner that a magnetic field is generated from the units formed by the crossover alternately in the plus and minus directions.

(Aspect 11)

In the mobile type non-contact power feeding device according to aspect 10, the crossover coil is set in such a manner that the area of the units generating a magnetic field in the plus direction is equal to that of the units generating a magnetic field in the minus direction.

(Aspect 12)

In the mobile type non-contact power feeding device according to aspect 8, a repeating coil of a repeating circuit is disposed corresponding to the power receiving coil of the power receiving side circuit.

The repeating circuit is independent of the power receiving circuit and the repeating coil resonates with a capacitor disposed in the repeating circuit and moves together with the power receiving coil.

(Aspect 13)

In the mobile type non-contact power feeding device according to aspect 8, power feeding is effected by a side power feeding method whereby the power transmission coil of the power feeding side circuit and the repeating coil of the repeating circuit corresponding to the power transmission coil are fixedly disposed on the side of an upright roadside section relative to a road surface or a ground surface.

(Aspect 14)

In the mobile type non-contact power feeding device according to aspect 8, power feeding is effected by a lower power feeding method whereby the power transmission coil of the power feeding side circuit and the repeating coil of the repeating circuit corresponding to the power transmission coil are fixedly disposed on the side of a road surface or a ground surface.

(Aspect 15)

In the mobile type non-contact power feeding device according to aspect 8, the power receiving side circuit such as the power receiving coil is mounted on a vehicle such as an automobile and other movable body.

Operation and the like of the present invention will now be described in the following items (1) through (10).

(1) In this non-contact power feeding device, power feeding is effected by a mobile method.

(2) The non-contact power feeding device is provided in such a manner that, in the case of power feeding, a power transmission coil and/or its repeating coil and a power receiving coil and/or its repeating coil are electromagnetically coupled through an air gap.

(3) In this manner, in this non-contact power feeding device, power is fed from a power feeding side to a power receiving side based on a mutual induction effect of magnetic induction.

(4) In this non-contact power feeding device, a high frequency magnetic field is strongly formed to strongly radiate the electromagnetic waves by a power transmission coil of the power feeding side formed in a long and massive loop shape or a repeating coil of the power feeding side.

(5) In the present invention, a crossover coil is adopted to serve as the power transmission coil or the repeating coil. The direction of a magnetic field generated for each unit formed by the crossover of the crossover coil is alternately reversed to provide reverse polarity.

(6) Thus, each magnetic field and the electromagnetic waves radiated toward a neighboring area, once propagated, overlap, interfere, and cancel each other by diffusion and are greatly weakened.

(7) Since a resonant repeating method is adopted in this non-contact power feeding device, it is possible to make the air gap large without losing electric energy.

(8) In this non-contact power feeding device, a repeating coil of a resonant repeating circuit is disposed on a power feeding side and/or a power receiving side.

(9) Accordingly, the high frequency magnetic field is formed more strongly to radiate the electromagnetic waves more strongly, but because of adoption of the crossover coil, the intensity of electromagnetic waves in the neighboring area can be surely lowered.

(10) The mobile type non-contact power feeding device of the present invention has the following first, second and third effects.

(First Effect)

First, in the present invention, a risk of electromagnetic pollution can be prevented. A crossover coil is adopted in the mobile type non-contact power feeding device according to the present invention to serve as a power transmission coil of the power feeding side or a repeating coil of the repeating circuit. A magnetic field is formed and radiated toward a neighboring area, and once propagated to the neighboring area, the individual electromagnetic waves cancel each other and are weakened by diffusion to greatly lower their intensity.

Accordingly, an adverse effect on the environment of the neighboring area can be prevented with certainty. As in the conventional non-contact power feeding device of this kind, a risk of generating electromagnetic pollution, such as a risk of generating electromagnetic disturbance and electronic jamming and a risk of creating a functional disorder (dysfunction) on human bodies, in an area which is tens of meters to hundreds of meters away, can be avoided.

(Second Effect)

Second, expansion of the air gap can be realized in the present invention.

For the mobile type non-contact power feeding device of the present invention, a resonant repeating method is adopted between a power transmission coil of a power feeding side and a power receiving coil of the power receiving side.

With this arrangement, it is possible to make the air gap large without losing electric power. In this non-contact power feeding device, it is therefore possible to feed a large amount of power of several kW order or more even over a large gap of, for example, several meters.

In this case, the stronger magnetic field is formed to radiate stronger electromagnetic waves, but a risk of generating electromagnetic pollution can be avoided by adopting the crossover coil.

(Third Effect)

The present invention can contribute to the widespread utilization of an electric vehicle. In the mobile type non-contact power feeding device of the present invention, as described above, the electromagnetic pollution can not only be avoided, but expansion of the air gap can also be realized. Accordingly, the mobile type non-contact power feeding device can be readily adopted as an easy and safe means for feeding power to the electric vehicle which is running on an express highway and other roads.

However, a bottleneck of the widespread utilization of the electric vehicle is, as is well known, the high-cost and heavy-weight structure of a battery mounted thereon. On the contrary, if the non-contact power feeding device of the present invention is adopted, it is possible to readily charge a battery along the way and as a result, small capacity, downsizing, cost reduction, reduction in weight, etc. of the battery of the electric vehicle can be realized.

For example, by continuously installing the power feeding side of the non-contact power feeding device of the present invention in place on the express highway to charge the battery of the running electric vehicle on the power receiving side, it is also possible to cause the electric vehicle on the express highway to run over a long distance.

In this manner, the present invention can greatly contribute to the power feeding to the electric vehicle running on the express highway and its widespread utilization.

As is obvious from the first, second and third effects described above, the present invention has a great effect in that all the problems of the conventional non-contact power feeding device of this kind can be solved.

BRIEF DESCRIPTION OF THE DRAWINGS

The above and other objects, features and advantages of the present invention will become more apparent from the following description when taken in conjunction with the accompanying drawings.

FIG. 1 is an explanatory perspective view of a mobile type non-contact power feeding device according to the present invention, wherein FIG. 1A is a first embodiment and FIG. 1B is a second embodiment;

FIG. 2 is an explanatory perspective view of the mobile type non-contact power feeding device according to the present invention, wherein

FIG. 3 is an explanatory perspective view of the mobile type non-contact power feeding device according to the present invention, wherein

FIG. 4 is an explanatory perspective view of a crossover coil of the mobile type non-contact power feeding device, wherein

FIG. 6 shows one example of a lower power feeding method, wherein FIG. 6A is an explanatory side view and FIG. 6B is an explanatory view of the essential part thereof.

DETAILED DESCRIPTION OF THE INVENTION

Figure 2A:
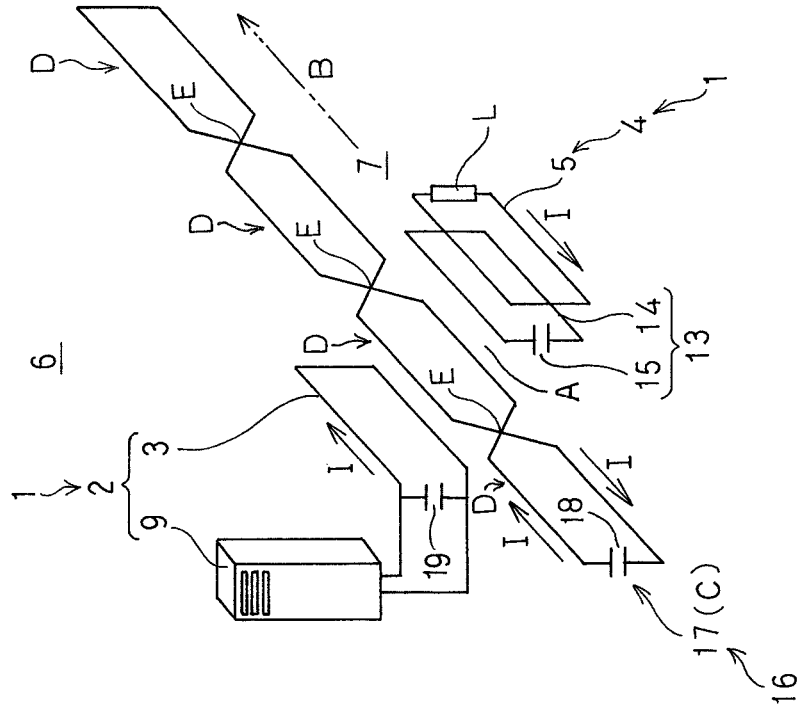
FIG. 2A is a third embodiment and FIG. 2B is a fourth embodiment.

A preferred embodiment of the present invention will now be fully described hereunder.

(Non-Contact Power Feeding Device 1)

First, a mobile type non-contact power feeding device 1 is generally described with reference to FIG. 6. The non-contact power feeding device 1 is provided to feed electric power from a power transmission coil 3 of a power feeding side circuit 2 to a power receiving coil 5 of a power receiving side circuit 4 through an air gap A based on a mutual induction effect of the electromagnetic induction.

The non-contact power feeding device is provided in such a manner that power feeding is effected by a mobile power feeding method whereby, in the case of power feeding, the power receiving coil 5 is moved corresponding to the stationary power transmission coil 3 through the air gap A. The power transmission coil 3 and the power receiving coil 5 are respectively formed in a loop-shaped flat structure.

Such a non-contact power feeding device 1 will be further described in detail. The power feeding side circuit 2 of a primary side, that is, a power feeding side and a track side, is fixedly disposed on a ground surface, a road surface, a floor surface or another part above a ground 6 at a power feeding stand or other power feeding area.

The power receiving side circuit 4 of the secondary side, that is, the power receiving side and a pickup side, is mounted on a vehicle 7 such as an electric vehicle and an electric train, or other movable body. The power receiving side circuit 4 is available not only for driving, but also for non-driving. The power receiving side circuit 4 is mainly connected to a car-mounted battery 8 as shown in FIG. 6, but it can also be connected directly to various types of loads L (see FIGS. 1 through 4).

The power transmission coil 3 of the power feeding side circuit 2 is connected to a power source 9 in which a high frequency inverter is used. The power receiving coil 5 of the power receiving side circuit 4 can be connected to a battery 8 in an example as shown in FIG. 6, wherein a running motor 10 is driven by the battery 8 charged by a power feeding operation. Reference numeral 11 of the figure is a converter for converting an alternating current to a direct current and 12 is an inverter for converting the direct current to the alternating current.

The power transmission coil 3 and the power receiving coil 5 respectively have a flat structure on which an insulated coil conducting wire is wound, for example, a number of times, in a loop shape on the same surface and are formed in a long rectangular circular shape along the direction of movement B of a movable body. The power transmission coil 3 is provided to have the same width as that of the power receiving coil 5 and is formed in a long and massive loop shape which is several times to tens of times longer than the power receiving coil 5. For example, the power transmission coil 3 can have the size of 5 m×28 cm, while the power receiving coil 5 can have the size of 1 m×28 cm.

The power feeding operation is effected by a mobile power feeding method. In other words, in the case of power feeding, the power receiving coil 5 of the power receiving side circuit 4 moves or runs in a closely corresponding manner to the long and massive power transmission coil 3 of the power feeding side circuit 2 and the power is fed through an air gap A with no contact.

Next, a mutual induction effect of electromagnetic induction will now be described. It is publicly known and used in practice that, in the case of power feeding between the power transmission coil 3 and the power receiving coil 5a, a magnetic flux is formed in the power transmission coil 3 to generate induced electromotive force in the power receiving coil 5, thereby feeding electric power to the power receiving coil 5 from the power transmission coil 3.

In other words, by applying a high frequency alternating current of, for example, about 10 kHz to 100 kHz to the power transmission coil 3 of the power feeding side circuit 2 by a power source 9 as an exciting current, a magnetic field is generated around the coil conducting wire of the power transmission coil 5 and a magnetic flux is formed in the direction perpendicular to the surface of the coil. The magnetic flux goes through the power receiving coil 5 of the power receiving side circuit 4 for interlinkage, wherein the induced electromotive force is generated to form the magnetic field, thereby feeding and receiving the electric power using the magnetic field formed.

In the non-contact power feeding device 1, a magnetic path of a magnetic flux is formed in the air gap A between the power transmission coil 3 and the power receiving coil 5 to provide electromagnetic coupling between both circuits of the power transmission coil 3 and the power receiving coil 5. In this manner, a power supply of several kW or more, for example, tens of kW to hundreds of kW is effected.

The mobile type power feeding device 1 is as described above.

(First Embodiment of the Present Invention)

A mobile type non-contact power feeding device 1 of the present invention will be described below. First, a first embodiment of the present invention will be described with reference to FIG. 1A.

In the non-contact power feeding device 1 of the first embodiment, a crossover coil C is adopted to serve as a power transmission coil 3 of a power feeding side circuit 2 on the power feeding side.

In the case of power feeding, a power transmission coil 3 consisting of the crossover coil C on the power feeding side and a power receiving coil 5 on the power receiving side are provided to form a magnetic path of magnetic flux in an air gap A between them. In this manner, the power transmission coil 3 (the crossover coil C) and the power receiving coil 5 are electromagnetically coupled to effect power feeding (refer to the above general description of the non-contact power feeding device 1).

The crossover coil C will now be described with reference to FIG. 4A. The crossover coil C on the power feeding side is formed in a long loop shape along the direction of movement B of the power receiving side and is crossed on the way to provide a plurality of units D by the crossover.

The crossover coil C conforms to the above description of the power transmission coil 3 and is formed in a flat structure, in which an insulated coil conducting wire is wound, for example, a plurality of turns (shown as one line in FIGS. 1A and 4A and other figures), in a long and massive loop shape on the same surface. The crossover coil C is crossed at crossover points E on the way to provide a plurality of units D which is divided and compartmentalized.

The number of crossover points E, that is, the number of crossovers, can be singular or plural. In FIGS. 1, 4A and other figures, the number of crossovers is 3 to provide 4 units D. An are of each unit D formed by the crossover (i.e., an area of a flat surface surrounded by an insulated coil conducting wire of the unit D) is set to be common, that is, to be same in FIGS. 1A, 4A and other figures, but it can be set to be different.

Figure 4A:
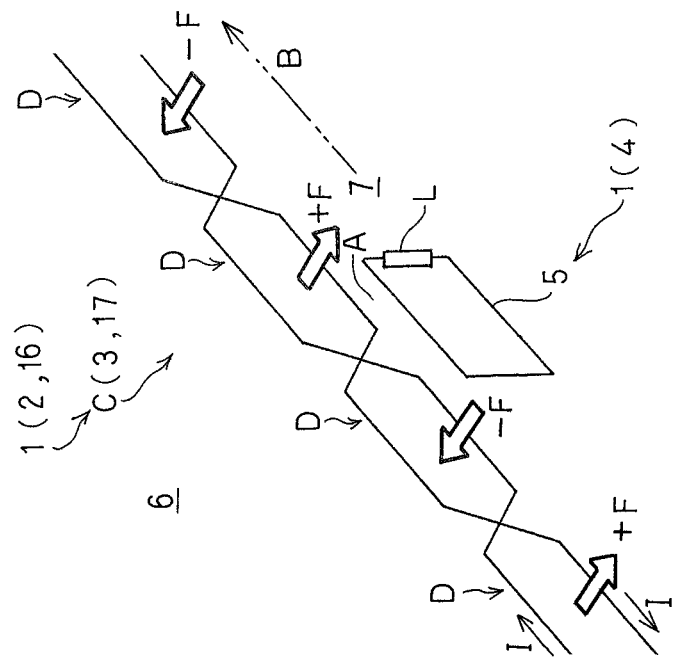
FIG. 4A shows its basic principle and FIG. 4B shows the positional relationship in which power feeding is difficult.
Figure 4B:
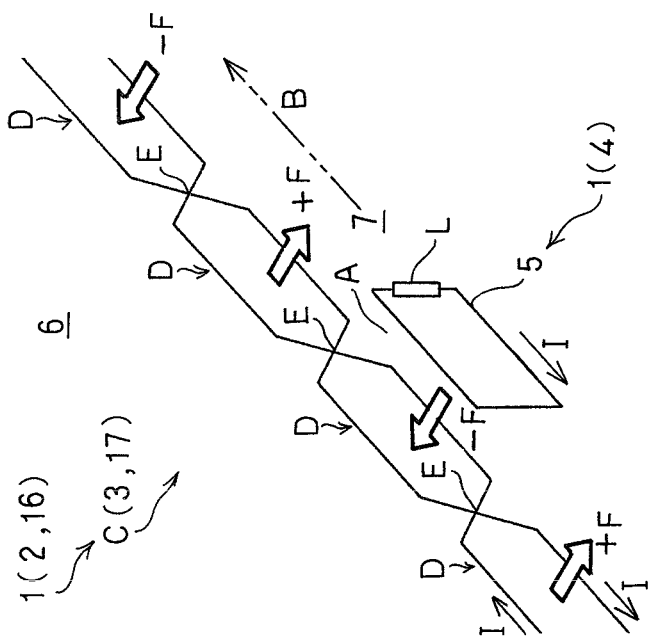

In any case, for the crossover coil C as shown in FIG. 4A, the direction of magnetic field F generated between each unit D formed and connected in series by the crossover is alternately reversed in the plus direction and in the minus direction.

In other words, when an electric current is fed to the crossover coil C, the magnetic field corresponding to the current is generated, but the direction of current is mutually reversed for each unit D adjacently formed by the crossover and as a result, the direction of magnetic field is alternately reversed in the plus direction and in the minus direction. Namely, for the crossover coil C, a north pole and a south pole of the magnetic field is reversed for each adjacent unit connected by the crossover to generate the magnetic field in the reverse direction.

The crossover coil C is set in such a manner that the area of the units D generating a magnetic field in the plus direction is equal to that of the units D generating the magnetic field in the minus direction.

In other words, the crossover coil C is provided so that the total area of the unit D of the magnetic field in the plus direction is equal to that of the units D of the magnetic field in the minus direction. It is to be noted that "equality" of the total area includes not only a case of perfect matching, but also a case of small difference. In FIGS. 1A, 4A and other figures, the area of each unit D is common, that is, equal as described above and thus, the units D in the plus direction and the units D in the minus direction are the same in number, that is, two each.

In the first embodiment, such a crossover coil C is adopted (to serve) as a transmission coil 3. The first embodiment is as described above.

(Second Embodiment)

Next, the second embodiment of the present invention will now be described with reference to FIG. 1B. In the non-contact power feeding device 1 of the second embodiment, in addition to the structure of the first embodiment, a repeating coil 14 of a repeating circuit 13 is disposed corresponding to the power receiving coil 5 of the power receiving side circuit 4.

The repeating circuit 13 is independent of the power receiving side circuit 4 and its repeating coil 14 resonates with a capacitor 15 disposed in the repeating circuit 13.

The non-contact power feeding device 1 of such a second embodiment will be described further. In the second embodiment, for the power receiving side, the repeating coil 14 of the power receiving side repeating circuit 13 is disposed on the side of an air gap A of the power receiving coil 5 of the power receiving side circuit 4 in a long loop shape closely corresponding to and matching the size of the power receiving coil 5.

The repeating circuit 13 composed of the repeating coil 14 and the capacitor 15 consists of a circuit which is independent of the power receiving side circuit 4 and resonates in a resonant frequency matching the operating frequency of the power source 9 of the power feeding side circuit 2, that is, the operating frequency of the entire circuit. In this specification, the resonant circuit also includes a magnetic resonance circuit in which an extremely high frequency is used.

In the non-contact power feeding device according to the second embodiment, since the repeating coil 14 resonates with the capacitor 15 in the case of power feeding, a magnetic path of a magnetic flux is formed, electromagnetically coupled and power feeding is effected between the power transmission coil 3 (the crossover coil C), and the repeating coil 14 and the power receiving coil 5, even though there is a large air gap A between them.

In this manner, a resonant repeating method is adopted together with the crossover coil C in the second embodiment. In the second embodiment, since the structures of the power transmission coil 3 (the crossover coil C) and other components conform to those of the first embodiment described above, these are given the same reference numerals and their descriptions are omitted.

The second embodiment is described above.

(Third Embodiment)

Next, a third embodiment of the present invention will be described with reference to FIG. 2A. In the non-contact power feeding device 1 of the third embodiment, a repeating coil 17 of a repeating circuit 16 is fixedly disposed corresponding to the power transmission coil 4. The repeating circuit 16 is independent of the power feeding side circuit 2, and the repeating coil 17 resonates with a capacitor 18 disposed in the repeating circuit 16.

In the case of power feeding operation, the power receiving coil 5 moves corresponding to the repeating coil 17 of the power feeding side through an air gap A.

Unlike the first and second embodiments, the crossover coil C is not adopted as the power transmission coil 3 of the power feeding side circuit 2. Instead, the crossover coil C is adopted as the repeating coil 17 of the repeating circuit 16.

The non-contact power feeding device 1 of the third embodiment will be further described. In the third embodiment, for the power feeding side, the repeating coil 17 of the power feeding side repeating circuit 16 is disposed to closely correspond to a side of an air gap A of the power transmission coil 3 of the power feeding side circuit 2.

The repeating circuit 16 consisting of the repeating coil 17 and the capacitor 18 is composed of a circuit independent of the power feeding side circuit 2 and also composed of a resonant circuit which resonates in a resonant frequency of an entire circuit matching the operational frequency of the power source 9 of the power feeding side circuit 2.

In the third embodiment, unlike the first and second embodiments described above, the crossover coil C is adopted as the repeating coil 17 of such a repeating circuit 16. Refer to the detailed description of the first embodiment for the crossover coil C. In the third embodiment, the repeating circuit 16 is provided with only one capacitor 18 which is common to each unit D of the repeating coil 17 (the crossover coil C).

Further, in this third embodiment, the power transmission coil 3 of the power feeding side circuit 2 is not formed in the long and massive loop shape as in the general example and the first and second embodiments described above, but in a short and small rectangular shape, in view of the fact that the crossover coil C of the long and massive loop shape is used as the repeating coil 17.

Reference numeral 19 is a capacitor which is disposed in the power feeding side circuit 2. With this arrangement, the power feeding side circuit 2 composed of the power transmission coil 3 and the capacitor 19 becomes a resonant circuit which resonates in a resonant frequency matching the operational frequency of the power source 9. In the embodiment shown in FIG. 2A, the capacitor 9 is disposed in parallel, but it can also be disposed in series in the case where the power transmission coil 3 is large, its inductance becomes large, and it is difficult to apply electric current (refer to fifth and sixth embodiments of FIG. 3 described later).

Referring to this third embodiment, in the case of power feeding, since the power transmission coil 3 resonates with the capacitor 19 and the repeating coil 17 (the crossover coil C) resonates with the capacitor 18, a magnetic path of a magnetic flux is surely formed, electromagnetically coupled, and power feeding is effected between the power transmission coil 3 and the repeating coil 17 (crossover coil C) on the power feeding side, and the power receiving coil 5 on the power receiving side, even though there is a large air gap A between them.

In this manner, a resonant repeating method is adopted with the crossover coil C in the third embodiment. Since the structures of the crossover coil C and other components in the third embodiment conform to those of the first embodiment described above, these are given the same reference numerals and their descriptions are omitted.

The third embodiment is as described above.

(Fourth Embodiment)

Figure 2B:
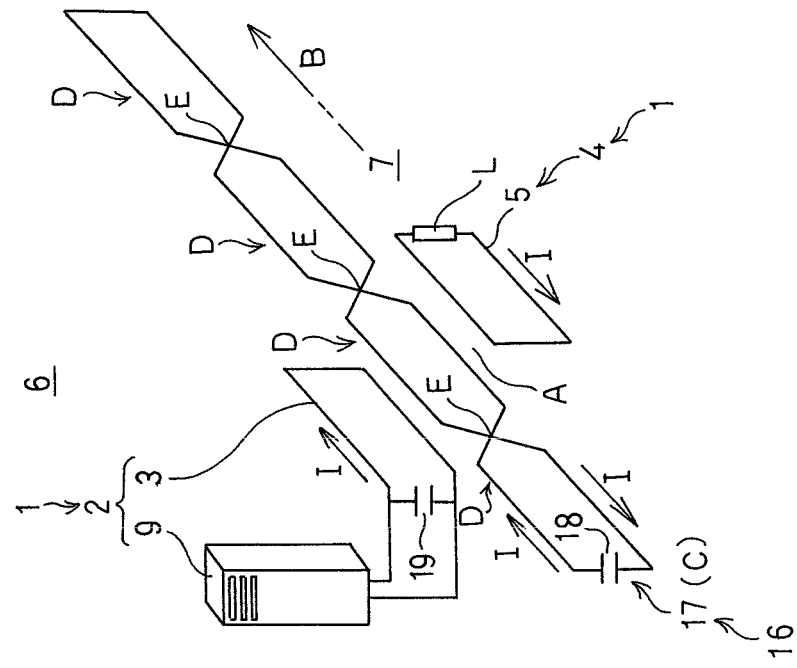

Next, a fourth embodiment of the present invention will now be described with reference to FIG. 2B. In the non-contact power feeding device 1 of the fourth embodiment, a power receiving side repeating circuit 13 as in the second embodiment is disposed in addition to the structure of the third embodiment described above.

In this manner, a number of resonant repeating methods is adopted together with the crossover coil C in the fourth embodiment. Since the structures of the repeating coil 17 (crossover coil C), the repeating coil 14 and other components in the fourth embodiment conform to those of the second and third embodiments described above, these are given the same reference numerals and their descriptions are omitted.

The fourth embodiment is as described above.

(Fifth Embodiment)

Figure 3A:
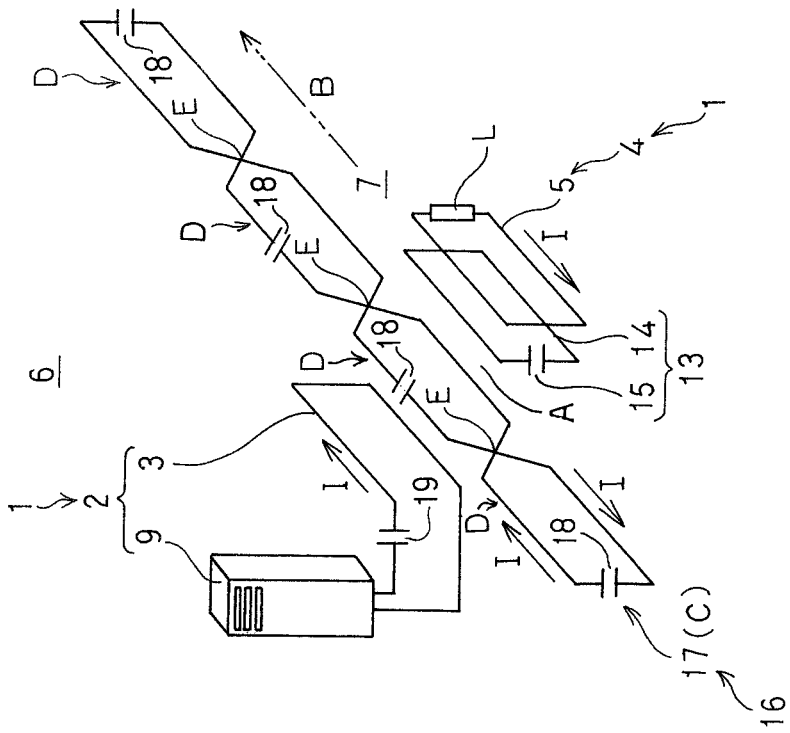
FIG. 3A is a fifth embodiment and FIG. 3B is a sixth embodiment.

Next, a fifth embodiment of the present invention will be described with reference to FIG. 3A. In the non-contact power feeding device 1 of the fifth embodiment, the capacitor 18 of the repeating circuit 16 is disposed in at least two units of the repeating coil 17 (the crossover coil C), in addition to the structure of the third embodiment described above. As typically shown in FIG. 3A, the capacitor 18 is disposed for each unit D.

Although the repeating circuit 16 of the third embodiment described above is provided with only one capacitor 18 which is common to each unit D, a number of capacitors 18 is disposed in the fifth embodiment.

The reason for disposing a number of capacitors 18 is as follows. If the repeating coil 17 (the crossover coil C) of the repeating circuit 16 consisting of the resonant circuit becomes long along the direction of movement B, the inductance becomes large. In order to keep the resonant frequency constant, it is necessary to decrease a capacity of the capacitor 18 for resonance in inverse proportion to the amount of inductance.

The capacity of the capacitor 18 in a circuit is inversely proportional to the number of series connection. It is therefore possible to keep the resonant frequency constant as originally expected by increasing the number of series connections of the capacitor 18 of the same capacity and by decreasing the capacity of the entire capacitor 18.

For the reason described above, the number of series connections of the capacitor 18 is increased in the fifth embodiment. As a representative example, the capacitor 18 is disposed for each unit D of the repeating coil (the crossover coil C). With this arrangement, there is the disadvantage that further length and massiveness of the repeating coil 17 (the crossover coil C) can be stably realized.

Figure 5:
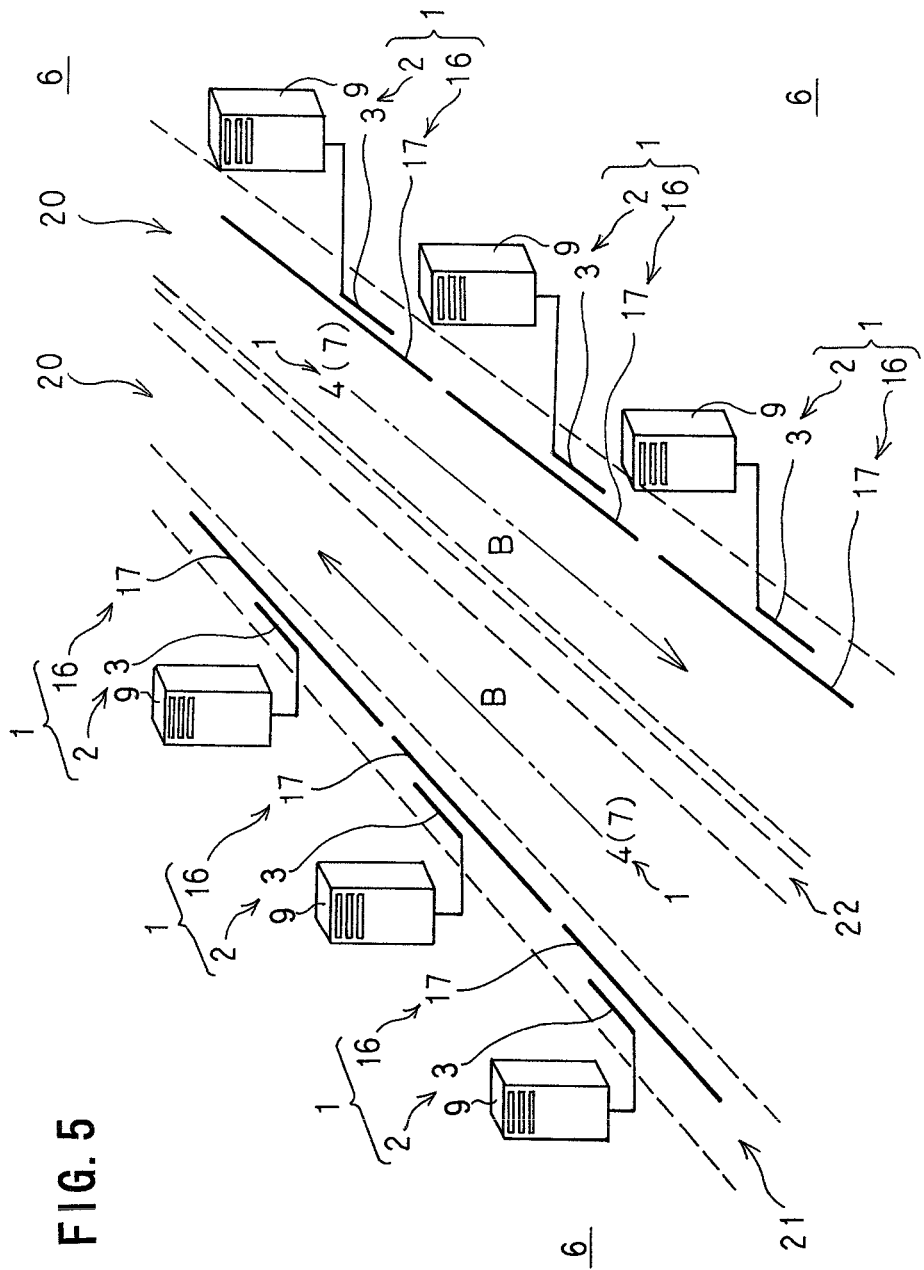
FIG. 5 is an explanatory perspective view of the mobile type non-contact power feeding device according to the present invention, wherein a power feeding method on a road is shown.

In this manner, in FIG. 5, the crossover coil C and a resonant repeating method are adopted and a number of capacitors 18 for resonance is used. Since the structures of the crossover coil C and other components conform to those of FIG. 3 described above, these are given the same reference numerals and their descriptions are omitted.

The fifth embodiment is as described above.

(Sixth Embodiment)

Figure 3B:
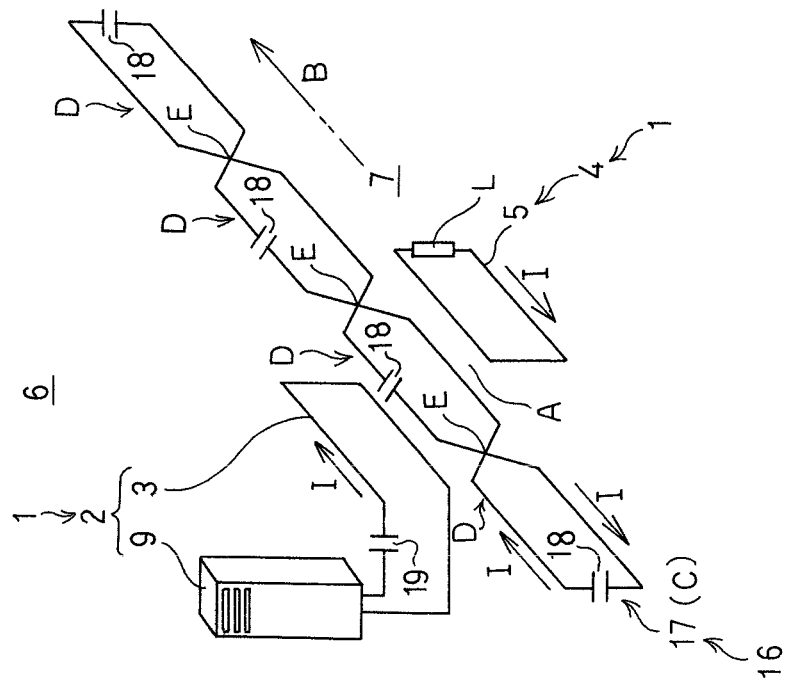

Next, a sixth embodiment of the present invention will be described with reference to FIG. 3B. In the non-contact power feeding device 1 of the sixth embodiment, the power receiving side repeating circuit 13 as in the second and fourth embodiments is disposed in addition to the structure of the fifth embodiment described above.

In this manner, in the sixth embodiment, a number of resonant repeating methods are adopted with the crossover coil C. Since the structures of the repeating coil 17 (the crossover coil C), the repeating coil 14 and other components in the sixth embodiment conform to those of the second and fifth embodiments described above, these are given the same reference numerals and their descriptions are omitted.

The sixth embodiment is as described above.

(Disposition Etc. of the Non-Contact Power Feeding Device 1)

Next, disposition and the like of the mobile type non-contact power feeding device 1 will now be described with reference to FIGS. 5 and 6.

First, a secondary side of the non-contact power feeding device 1, that is, a power receiving side or a pickup side, in other words, a power receiving side circuit 4 such as a power receiving coil 5 and a power receiving side repeating circuit 13 such as a repeating coil 14 are mounted on a vehicle such as an automobile or other movable body.

The primary side of the non-contact power feeding device 1, that is, the power feeding side or the track side, in other words, the power feeding side circuit 2 such as the power source 9 and the power transmission coil 3 and the power feeding side repeating circuit 16 such the repeating coil 17 are fixedly disposed on a ground surface, a road surface, a floor surface or another part above the ground 6.

Disposition and the like of the mobile type non-contact power feeding device 1 on the power feeding side will be further described. A side power feeding method and a lower power feeding method are representative power feeding methods by the mobile type non-contact power feeding device 1.

Referring to the side power feeding method, the power transmission coil 3 (the crossover coil C) and the repeating coil 17 (the crossover coil C) on the power feeding side are fixedly disposed on the side of an upright roadside section 21 such as a wall surface of a road shoulder relative to the road surface or the ground surface of a road 20 on the side of a part above the ground 6 (refer to a left lane of FIG. 5 for the third through sixth embodiments described above). Of course, for the power receiving side, the power receiving coil 5 and the repeating coil 14 are disposed on the side section of the vehicle 7 such as an electric vehicle or other movable body.

In the case of the lower power feeding method, the power transmission coil 3 and the repeating coil 17 on the power feeding side are fixedly disposed by an embedding method or the like on a road surface or a ground surface of a road 20 on the side of a part above the ground 6 (refer to FIG. 6 for the first and second embodiments described above and refer to a right lane of FIG. 5 for the third through sixth embodiments). Of course, for the power receiving side, the power receiving coil 5 and the repeating coil 14 are disposed on the bottom section of the vehicle 7 such as an electric vehicle or other movable body.

The side power feeding method is superior to the lower power feeding method in installation cost, maintenance of reliability and the like. Reference numeral 22 of FIG. 5 is a center divider. The configuration in which the power transmission coil 3 and the repeating coil 17 are fixedly disposed on the center divider is also part of the side power feeding method.

At any rate, as shown in FIG. 5, there are many cases where a number of power feeding sides is disposed along the direction of running, that is, the direction of movement B, of the vehicle 7 such as the electric vehicle.

Each unit D of each power transmission coil 3 (the crossover coil C) on the power feeding side and each unit D of each repeating coil 17 (the crossover coil C) on the power feeding side are installed in a row, that is, in a substantially belt-like pattern, over the whole length of a power feeding area along the direction of movement B. The entire length varies from tens of meters to hundreds of meters.

The disposition etc. of the non-contact power feeding device 1 is as described above.

(Operation Etc.)

The mobile type non-contact power feeding 1 of the present invention is constructed as described above. Operation, etc. of the present invention will now be described in the following items (1) through (10).

(1) In the non-contact power feeding device 1, a power feeding is conducted by a mobile power feeding method. In other words, in the case of power feeding, the secondary side mounted on the vehicle 7 such as the electric vehicle or other movable body, that is, the power receiving coil 5 (refer to the first through sixth embodiments) and the repeating coil 14 (refer to the second, fourth and sixth embodiments) on the power receiving side or the pickup side moves or runs. These power receiving coil 5 and repeating coil 14 move or run, with no contact through an air gap, closely corresponding to the primary side fixedly disposed on the road 20 or another part above ground 6 side, that is, the power transmission coil 3 (refer to first and second embodiments) and the repeating coil 17 (refer to the third through sixth embodiments) on the power feeding side or the track side.

(2) In the case of power feeding, on the power feeding side of the non-contact power feeding device 1, a high frequency alternating current is applied from a power source 9 to the power transmission coil 3 of the power feeding side circuit 2 as an exciting current. In this manner, a magnetic path of a magnetic flux is formed and electromagnetically coupled between the power feeding side and the power receiving side through the air gap A.

In other words, the magnetic path of the magnetic flux is formed and electromagnetically coupled between the power transmission coil 3 (the crossover coil C) and the power receiving coil 5 (refer to first embodiment), between the power transmission coil 3 (the crossover coil C), the repeating coil 14 and the power receiving coil 5 (refer to the second embodiment), between the power transmission coil 3, the repeating coil 17 (the crossover coil C) and the power receiving coil 5 (refer to the third and fifth embodiments), or between the power transmission coil 3, the repeating coil 17 (the crossover coil C), the repeating coil 14 and the power receiving coil 5 (refer to the fourth and sixth embodiments).

(3) In this manner, the non-contact power feeding device 1 is provided in such a manner that power is fed from the power transmission coil 3 and/or the repeating coil 17 to the repeating coil 14 and/or the power receiving coil 5 based on a mutual induction effect of electromagnetic induction. In other words, power feeding is conducted from the primary side, that is, the power feeding side or the track side to the secondary side, that is, the power receiving side or the pickup side. Specifically, power is sequentially fed from each unit D (the power transmission coil 3 and the repeating coil 17) of the long and massive crossover coil C to the repeating coil 14 and the power receiving coil 5 which are moving closely corresponding to each unit D.

(4) A high frequency alternating current of about 10 kHz to 100 kHz is used in the non-contact power feeding device 1 of this type. Since power feeding is conducted based on the mutual induction effect of electromagnetic induction using such a high frequency alternating current, a high frequency magnetic field of a large density (an alternating magnetic field) is formed to radiate strong high-frequency electromagnetic waves.

Further, the power transmission coil 3 or the repeating coil 17 on the power feeding side adapted to irradiate such a high frequency magnetic field and high frequency electromagnetic waves is formed in a long and massive loop shape and is provided in a row, that is, in a substantially belt shape, between tens of meter and hundreds of meters over the entire length of the power feeding area.

(5) Thus, in the present invention, the crossover coil C is adopted as the power transmission coil 3 (refer to the first and second embodiments) or the crossover coil C is adopted as the repeating coil 17 (refer to the third to sixth embodiments).

The crossover coil C is provided in such a manner that the direction of the magnetic field generated from each unit D formed by the crossover becomes a reverse polar zone and is alternately reversed in the plus direction and in the minus direction.

(6) After formation of each unit D, the magnetic field radiated outside and gradually diffused from a power feeding area in which a power feeding side of the non-contact power feeding device 1 is provided to a neighboring area, for example, tens of meters to hundreds of meters away, is cancelled out and weakened in the neighboring area. In other words, the magnetic field in the plus direction and the magnetic field in the minus direction which are adjacent to each other, when propagated to the neighboring area, spread, overlap, and interfere with each other by diffusion. Both magnetic fields form a synthetic magnetic field and cancel each other out based on the reverse polarity and as a result, the magnetic field density greatly decreases.

Accordingly, all the electromagnetic waves radiated out of the power feeding side of the non-contact power feeding device 1 are greatly reduced to significantly lower the strength in the area which is away from the non-contact power feeding device 1. Thus, the electric field and the magnetic field diffused outside, that is, an electric line of force and a magnetic line of force are quantitatively reduced and the strength is qualitatively reduced.

As described above, since cancelling of the magnetic field in the plus direction and the magnetic field in the minus direction is important, it is effective in realization of operation that the crossover coil C is set so that the entire area of each unit D generating the magnetic field in the plus direction is equal to that of each unit D generating the magnetic field in the minus direction. Being equal in this case includes not only a case of perfect matching, but also a case of a small difference.

(7) On the other hand, a resonant repeating method is adopted in this non-contact power feeding device 1. Namely, the non-contact power feeding device 1 is provided in such a manner that the repeating coil 17 (the crossover coil C) of the resonant repeating circuit 16 (refer to the third to sixth embodiments) and the repeating coil 14 of the resonant repeating circuit 13 (refer to the second, fourth and sixth embodiments) are disposed between the power transmission coil 3 of the power feeding side and the power receiving coil 5 of the power receiving side to provide electromagnetic coupling between them. In this non-contact power feeding device 1, a large exciting reactive power is fed to a magnetic path of the air gap A by resonance.

When the resonant repeating method is adopted, the gap power feeding efficiency can be improved by the resonance and the air gap A can be made large without wasting the electric energy supplied.

(8) Consideration is now made for the air gap A of each embodiment of the present invention. As compared to the first embodiment, the repeating coil 14 resonating with the power transmission coil 3 (the crossover coil C) of the power feeding side is used on the power receiving side in the second embodiment. It is therefore possible to make the electromagnetic coupling between them more definite even though the air gap A is large.

Further, since the repeating coil 14 is closely located to face the power receiving coil 5, the degree of electromagnetic coupling between them is extremely high. Referring to the second embodiment, the air gap A can be made larger by use of the repeating coil 14.

In the third and fifth embodiments, since the power transmission coil 3 and the repeating coil 17 (the crossover coil C), which are electromagnetically coupled by resonance, are used on the power feeding side, the air gap A can be made large by their use.

Further, in the fourth and sixth embodiments, since the resonating repeating coil 14 is added to the power receiving side, the air gap A can be made larger.

(9) With the adoption of such a resonant repeating method, a high frequency alternating current of more than 10 kHz, for example, of about 10 kHz to 100 kHz, is used in this non-contact power feeding device 1 and thus, stronger magnetic field is formed to radiate stronger electromagnetic waves.

However, by adopting the crossover coil C described above, the intensity of the magnetic field and electromagnetic waves radiated to the neighboring area can be reduced with certainty. Thus, an adverse effect of the electromagnetic waves on the neighboring area can be avoided.

(10) For the crossover coil C (the power transmission coil 3 or the repeating coil 17), in the case where the mobile power receiving coil 5 or repeating coil 14 is closely located to correspond to the crossover point E, power feeding becomes difficult temporarily.

Further, unlike each unit D area, a synthetic magnetic field, in which the magnetic field in the plus direction and the magnetic field in the minus direction cancel each other, is formed at once at the crossover point E to instantaneously generate a flat zero of power feeding.

In other words, for each magnetic field formed in each unit D area of the crossover coil C (the power transmission coil 3 or the repeating coil 17), it is not possible in terms of position for the magnetic field in the plus direction and the magnetic field in the minus direction to interfere and immediately cancel at the time of formation. Thus, smooth power feeding is conducted, with time, to the power receiving coil 5 or the repeating coil 14, which moves in a closely corresponding manner, by each magnetic field formed in each unit D area.

At the crossover point E, as in the neighboring area described above, a synthetic magnetic field, in which the magnetic field in the plus direction and the magnetic field in the minus direction interfere and cancel each other, is formed. Thus, such an interfering and cancelling synthetic magnetic field is immediately formed at the crossover point E at the time of formation of the magnetic field, while, in the neighboring area, it is only formed at the time when the magnetic field formed in each unit D area is radiated and diffused, in other words, at the time when the magnetic field is propagated to the remote neighboring area.

The vehicle 7 such as the electric vehicle can pass through such a crossover point E by the power of a battery 8 which has been already charged and the influence can be almost ignored.

Operation and the like are as described above.

What is claimed is:

1. An apparatus for non-contact feeding of power by electromagnetic induction, the apparatus comprising:
    a crossover coil serving as a stationary power transmission coil of a power feeding circuit; and
    a power receiving coil of a power receiving circuit; and
    wherein said non-contact feeding of power by electromagnetic induction is from said power transmission coil to said power receiving coil;
    wherein the power receiving coil is arranged to move relative to the stationary power transmission coil through an air gap, the power receiving coil comprising a flat loop;
    wherein the crossover coil has an array of a plurality of flat loops elongated in a direction of movement, each one loop of the plurality of flat loops being separated from each other by a crossover, each one loop of the plurality of flat loops of the crossover coil being a unit; and
    wherein crossovers of the crossover coil effect a reversal of direction of a magnetic field being generated by the units between a plus direction and a minus direction from each one unit to each next unit of the units of the crossover coil.

2. The apparatus according to claim 1, wherein the units generating the magnetic field in the plus direction at a given time have an area equal to that of the units generating magnetic field in the minus direction at said given time.

3. The apparatus according to claim 1, wherein a repeating coil of a repeating circuit is fixedly disposed relative to the power receiving coil of the power receiving circuit, the repeating circuit is independent of the power receiving circuit, and the repeating coil resonates with a capacitor disposed in the repeating circuit and moves together with the power receiving coil.

4. The apparatus according to claim 1, wherein the power transmission coil of the power feeding circuit is fixedly disposed alongside and above a road surface or a ground surface.

5. The apparatus according to claim 1, wherein the power transmission coil of the power feeding circuit is fixedly disposed on or embedded in a road surface or a ground surface.

6. The apparatus according to claim 1, wherein the power receiving coil of the power receiving circuit is mounted on a vehicle or other movable body.

7. An apparatus for non-contact feeding of power by electromagnetic induction, the apparatus comprising:
    a stationary power transmission coil of a power feeding circuit; and
    a power receiving coil of a power receiving circuit; and
    wherein said non-contact feeding of power by electromagnetic induction is from said power transmission coil to said power receiving coil;
    wherein the power receiving coil is arranged to move relative to the stationary power transmission coil through an air gap;
    wherein the power receiving coil and the power transmission coil each comprises a flat loop;
    wherein a repeating coil of a repeating circuit is fixedly disposed relative to the power transmission coil, the repeating circuit being independent of the power feeding circuit, the repeating coil resonating with a capacitor disposed in the repeating circuit;

wherein the power receiving coil is arranged to move relative to the repeating coil through the air gap for power feeding;

wherein the repeating coil is a crossover coil having an array of a plurality of flat loops elongated in a direction of said movement;

wherein each one loop of the plurality of flat loops is separated from each other by a crossover, each one loop of the plurality of flat loops of the crossover coil being a unit; and wherein a direction of a magnetic field being generated by units formed by crossovers of the crossover coil is alternately reversed in a plus direction and a minus direction.

8. The apparatus according to claim 7, comprising a capacitor for each unit of the repeating coil.

9. The apparatus according to claim 7, wherein the units generating the magnetic field in the plus direction at a given time have an area equal to that of the units generating magnetic field in the minus direction at said given time.

10. The apparatus according to claim 7, wherein a repeating coil of a second repeating circuit is fixedly disposed relative to the power receiving coil of the power receiving circuit, the second repeating circuit is independent of the power receiving circuit, and the repeating coil of the second repeating circuit resonates with a capacitor disposed in the second repeating circuit and moves together with the power receiving coil.

11. The apparatus according to claim 7, wherein the power transmission coil of the power feeding circuit and the repeating coil of the repeating circuit are fixedly disposed alongside or above a road surface or a ground surface.

12. The apparatus according to claim 7, wherein the power transmission coil of the power feeding circuit and the repeating coil of the repeating circuit are fixedly disposed on or embedded in a road surface or a ground surface.

13. The apparatus according to claim 7, wherein the power receiving coil of the power receiving circuit is mounted on a vehicle or other movable body.

14. An apparatus for non-contact feeding of power by electromagnetic induction, the apparatus comprising:

a plurality of stationary coils of a power feeding circuit, each one of the plurality of stationary coils comprising a plurality of flat loops elongated in a common first direction and being delimited from an adjacent one of the plurality of stationary coils by a crossover, the plurality of stationary coils formed by a common conductor and together forming a stationary power transmission coil; and a power receiving coil of a power receiving circuit configured to move in said first direction through an air gap, said movement being relative to the stationary power transmission coil, the power receiving coil comprising a flat loop, said non-contact feeding of power by electromagnetic induction being from said stationary power transmission coil to said moving power receiving coil; and wherein each crossover between adjacent ones of the plurality of stationary coils effects a reversal of direction of a magnetic field being generated by said adjacent ones of the plurality of stationary coils between one of a plus direction and a minus direction and another of the plus direction and the minus direction so that adjacent coils of the plurality of stationary coils generate different magnetic field polarity.

15. The apparatus of claim 14, wherein adjacent stationary coils of the stationary power transmission coil are connected in series by the crossover delimiting the adjacent stationary coils.

\* \* \* \* \*